United States Patent [19]
Haddock et al.

[11] Patent Number: 5,265,014
[45] Date of Patent: Nov. 23, 1993

[54] MULTI-MODAL USER INTERFACE

[75] Inventors: Nicholas Haddock, Loughton; Andrew Nelson, St. Andrews, both of England; Derek Proudian, Moss Beach, Calif.

[73] Assignee: Hewlett-Packard Company, Palo Alto, Calif.

[21] Appl. No.: 837,675

[22] Filed: Feb. 14, 1992

Related U.S. Application Data

[63] Continuation of Ser. No. 507,340, Apr. 10, 1990, abandoned.

[51] Int. Cl.$^5$ .............................................. G06F 15/38
[52] U.S. Cl. ................................................ 364/419.08
[58] Field of Search ................ 364/419; 395/155, 161, 395/144

[56] References Cited

U.S. PATENT DOCUMENTS

| | | | |
|---|---|---|---|
| 4,627,001 | 12/1986 | Stapleford et al. | 381/48 |
| 4,661,924 | 4/1987 | Okamoto et al. | 364/900 |
| 4,829,423 | 5/1989 | Tennant et al. | 364/200 |
| 4,862,390 | 8/1989 | Weiner | 364/521 |
| 5,095,448 | 3/1992 | Obchi et al. | 395/155 |
| 5,119,474 | 6/1992 | Beitel et al. | 395/161 |
| 5,129,057 | 7/1992 | Strope et al. | 395/161 |

OTHER PUBLICATIONS

Cohen, Philip R., et al. "Synergistic Use of Direct Manipulation and Natural Language", *CHI 89 'Wings for the Mind' Conference Proceedings*, Austin, Tex., Apr. 30–May 4, 1989, pp. 227–233.

Embley, David W., et al. "A Graphical Data Manipulation Language for an Extend Entity-Relationship Model", *Computer*, Mar. 1990, pp. 26–36.

Kobsa, Alfred, et al. "Combining Deictic Gestures and Natural Language for Referenct Identification", *Proceedings of the 11th International Conference on Computational Linguistics*, Bonn University, Bonn, West Germany, 1986 pp. 356–361.

Neal, Jeannette G., et al. "Intelligent Multi-Media Interface Technology", in *Architectures for Intellegent Interfaces: Elements and Prototypes*, chaired by Joseph W. Sullivan et al., Monterey, Calif., Mar. 29–Apr. 1, 1988, pp. 69–91.

*Primary Examiner*—Roy N. Envall, Jr.
*Assistant Examiner*—Xuong Chung

[57] ABSTRACT

A multi-modal user interface for removing a referential ambiguity from a natural language input to a computer system. A user provides both a textual input and a referential input. The referential input is provided by using a mouse to point to text items on the screen. The referential input removes the ambiguity from the textual input. The textual input typically is a query of a database and is displayed as a query in a query card. The referential input is a selection of elements from responses to previous queries. The user selects various ones of these query cards for display on the screen at any given time and points to elements of the responses in the displayed cards as necessary to provide referential inputs for new queries.

16 Claims, 6 Drawing Sheets

MULTI-MODAL USER INTERFACE

CROSS REFERENCE TO RELATED APPLICATION(S)

This is a continuation of copending application Ser. No. 07/507,340 filed on Apr. 10, 1990, now abandoned.

BACKGROUND OF THE INVENTION

The present invention relates generally to computer database systems and more particularly to a user interface which facilitates natural language communication between a user and a database by providing an easy way for a user to remove ambiguities from a natural language query of the database.

Computer database systems are being used to store and manage more and more different kinds of data. Airline reservation systems, bank account information systems, and computerized library card indices are but a few examples of such systems. Many of these systems are now becoming available for use by the general public. For example, until recently airline reservations could only be booked by trained reservation clerks, but now anyone having a home computer and a modem can have direct access to airline reservation computers. Similarly, many public libraries are placing computer terminals about the library for use by library patrons in finding books and other references.

A common problem in learning to use computers is that computers require strict compliance with a set of precise grammatical rules governing communication between the computer and the user. The SQL database language is an example of such a set of rules. This kind of precise communication is very unnatural for humans because most people are accustomed to speaking and writing in "natural language", that is, everyday spoken English which is often ungrammatical and ambiguous but which nevertheless is easily understandable by other humans.

As long as computers were used only by a relatively small number of specialists, this need to use precise rules in communicating with computers was not perceived as a major problem. Humans are perfectly capable of learning to use languages such as SQL to communicate with computers. Persons such as airline and travel agency reservation clerks were trained to use such languages to communicate with computers, and these trained specialists then took care of user-computer communication for everyone else.

As computer database systems become more widely accessible, more people wish to use them. In addition, many people are finding that they no longer have any choice—for example, libraries are abolishing the traditional card index in favor of the computerized index, and patrons of such libraries can no longer locate books except by using the computerized index system.

Most people have neither the time nor the desire to learn computer languages. Accordingly a need has arisen for computer database systems that are usable by persons having no formal training in computer database languages. Computers, in other words, must be "user friendly" to all comers, and to this end much effort is being devoted to designing computer systems that can communicate with people in "natural language", that is in ordinary human speech.

One of the problems of designing a computer system that can communicate in natural language is interpreting ambiguous queries. Consider the following natural language dialogue between a user and a computer database system:

USER: Which sales staff report to the Head Office?
COMPUTER: Alecia Andrews, Bill Bronson, Carl Clemson.
USER: Which sales staff visited Pinewood in April?
COMPUTER: Marcia Martin, Nancy Novarro, Oscar Ottoman.
USER: Which of these live in London?

The word "these" in the third query is ambiguous. Does "these" refer to persons who report to the head office, or to those who visited Pinewood, or to both? Using the word "these" creates a referential ambiguity, that is, an ambiguous reference to a previous item of information.

A referential ambiguity can be resolved by asking the user for more information, for example as follows:

USER: Which sales staff report to the Head Office?
COMPUTER: Alecia Andrews, Bill Bronson, Carl Clemson.
USER: Which sales staff visited Pinewood in April?
COMPUTER: Marcia Martin, Nancy Novarro, Oscar Ottoman.
USER: Which of these live in London?
COMPUTER: I cannot understand the question. "These" is ambiguous. Please rephrase your question or press "?" for help in using the system.
USER: Which of those who visited Pinewood?
COMPUTER: I cannot understand the question. "Those" is ambiguous. What do you want to know about "those who visited Pinewood"? Please rephrase your question or press "?" for help in using the system.
USER: (exasperated) Which of the sales staff who visited Pinewood in April live in London?
COMPUTER: Nancy Novarro and Oscar Ottoman.

Such a method of resolving ambiguities can be highly irritating to a user and often results in much wasted time as the user tries to formulate unambiguous questions. To avoid this problem, various attempts have been made to develop natural language processing technologies that can automatically resolve such ambiguities. However, these methods generally involve complex reasoning about the user and the information in the database and have not adequately solved the problem.

It will be apparent from the foregoing that there is a need for a user-friendly way to resolve a referential ambiguity in a natural language query of a computer database system.

SUMMARY OF THE INVENTION

The present invention provides a multi-modal user interface which facilitates natural language communication between a user and a computer database by providing means for a user to remove a referential ambiguity from a query by pointing to a textual reference on a visual display. This interface is easy for users to learn and use, demands minimal computer resources, and avoids user irritation and wasted time.

Briefly and in general terms, a multi-modal user interface according to the invention includes a keyboard or the like for receiving a textual communication from a user, a mouse or the like for receiving a referential input from the user, and computer resources that detect any referential ambiguity in the text and use the referential input to remove the ambiguity to provide an unambiguous communication from the user.

In a typical interactive database session, a user asks a string of questions some of which may refer back to responses to earlier questions. Such a reference is often ambiguous in that it is not clear which question or response is being referred to. In accordance with a preferred embodiment of the present invention, the previous questions and responses are identified and displayed on a computer screen. The user points to any number of elements in one or more previous responses to which he/she intends to refer.

It will be apparent that speech recognition apparatus or other means may be used to receive textual input from the user. Similarly, a touch screen, speech recognition apparatus, or other pointer including cursor keys or the like may be used to receive the referential input.

A method of resolving ambiguities preferably utilizes query cards to arrange and display user queries and system responses. The method includes the steps of receiving a database query and a referential input from a user, identifying any referential ambiguity in the query, resolving the ambiguity according to the referential input, evaluating the query, and providing a response to the user.

A query is preferably displayed in the form of a query card which has a portion for displaying the query and a portion for displaying a response to the query. A list of previous queries is also displayed. The user selects one or several previous query cards for display and uses the mouse or other pointer to identify elements in the responses on the cards as the referential input for the next query.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

Figure 1:
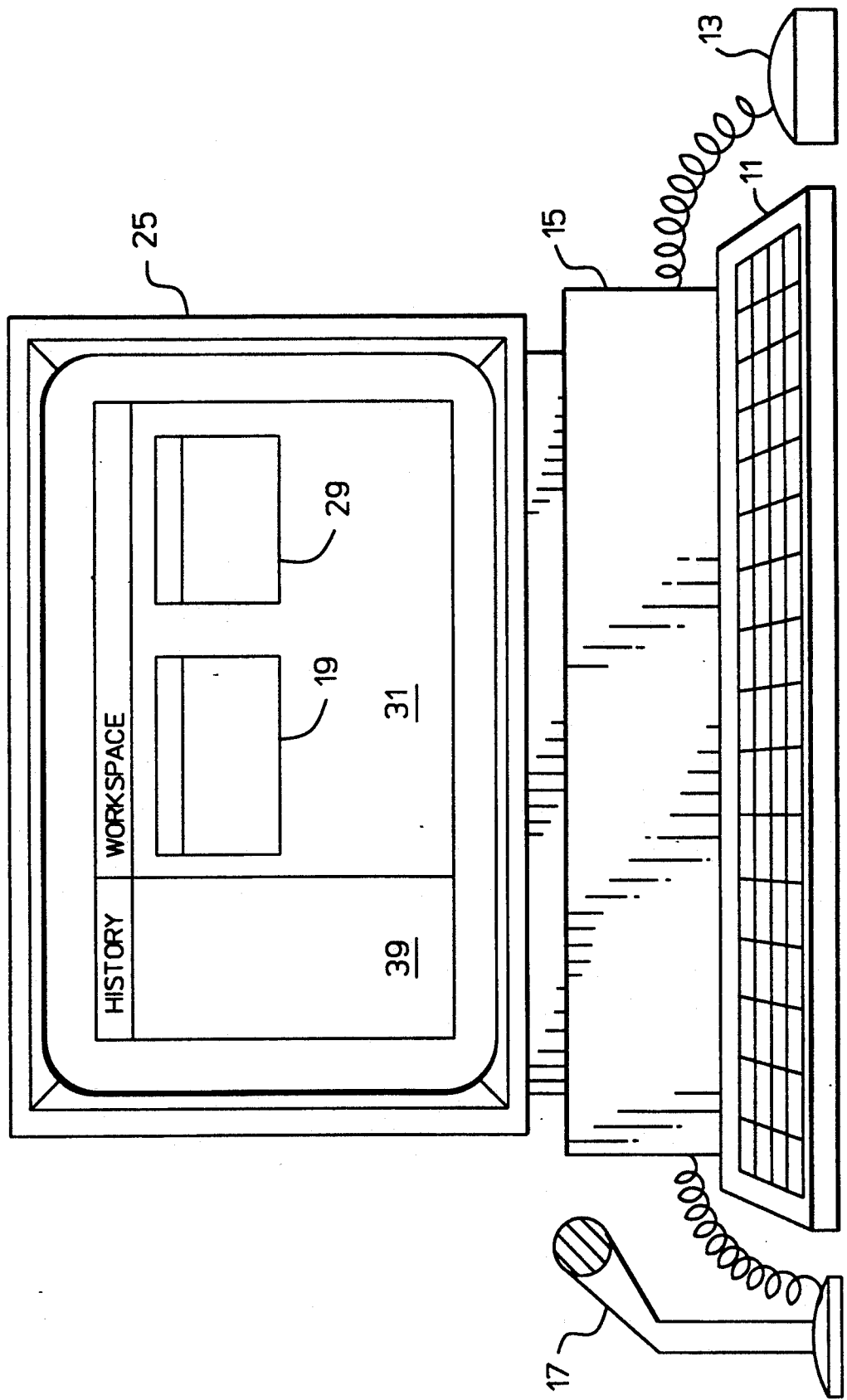
FIG. 1 shows a computer database system including a multi-modal interface that displays database queries in query cards according to the present invention.

As shown in the drawings for purposes of illustration, the invention is embodied in a novel multi-modal user interface that makes it easy for a user to resolve referential ambiguities in natural language database queries. As more and more people are using computer database systems, systems that can respond to natural language queries have been developed. There has been a need for a user-friendly way to resolve ambiguities in such queries.

In accordance with the invention, a user provides a textual input and a referential input. The computer system uses the referential input to resolve any referential ambiguity in the textual input and thereby provide an unambiguous input which can then be used, for example, to obtain information from a database. An interface according to the invention provides a user-friendly, easily-learned way to resolve referential ambiguities in a natural language textual input such as a database query.

As shown in FIG. 1, a multi-modal user interface according to the invention comprises input means such as a keyboard 11 and a mouse 13 for receiving a textual input and a referential input, respectively, from a user (not shown); means, for example a portion of a computer system generally designated 15 for detecting a referential ambiguity in the textual input; and means such as a portion of the computer system 15 for removing the ambiguity according to the referential input to provide an unambiguous textual input.

Instead of (or in addition to) the keyboard 11, any of a variety of other input means known in the art can be used to receive textual input from the user. One embodiment, for example, includes means such as a microphone 17 and associated hardware and software in the computer system 15 responsive to human speech to provide a digital representation of the spoken word. By utilizing this apparatus the user communicates textual information to the computer system by talking to the computer rather than by typing the information at the keyboard. The microphone receives the user's spoken words and provides an analog signal, and the hardware and software convert the analog signal into a digital signal which the computer uses just as it would use typed keyboard input.

Likewise, rather than the mouse 13 alternate embodiments provide a touch-sensitive screen (not shown), speech recognition means, designated keys such as cursor keys on the keyboard 11, or other input means for receiving the referential input from the user. The referential input essentially amounts to a selection of one or more textual elements in previous responses that are being displayed on the screen; the user makes the selection by pointing to the desired elements rather than by having to type any text.

The invention is advantageously embodied in a user interface of a database system which receives a database query from a user, evaluates the query, and provides a result of the evaluation to the user. The database system uses a referential input from the user to remove a referential ambiguity in the query and thereby provide an unambiguous query for evaluation.

Figure 2:
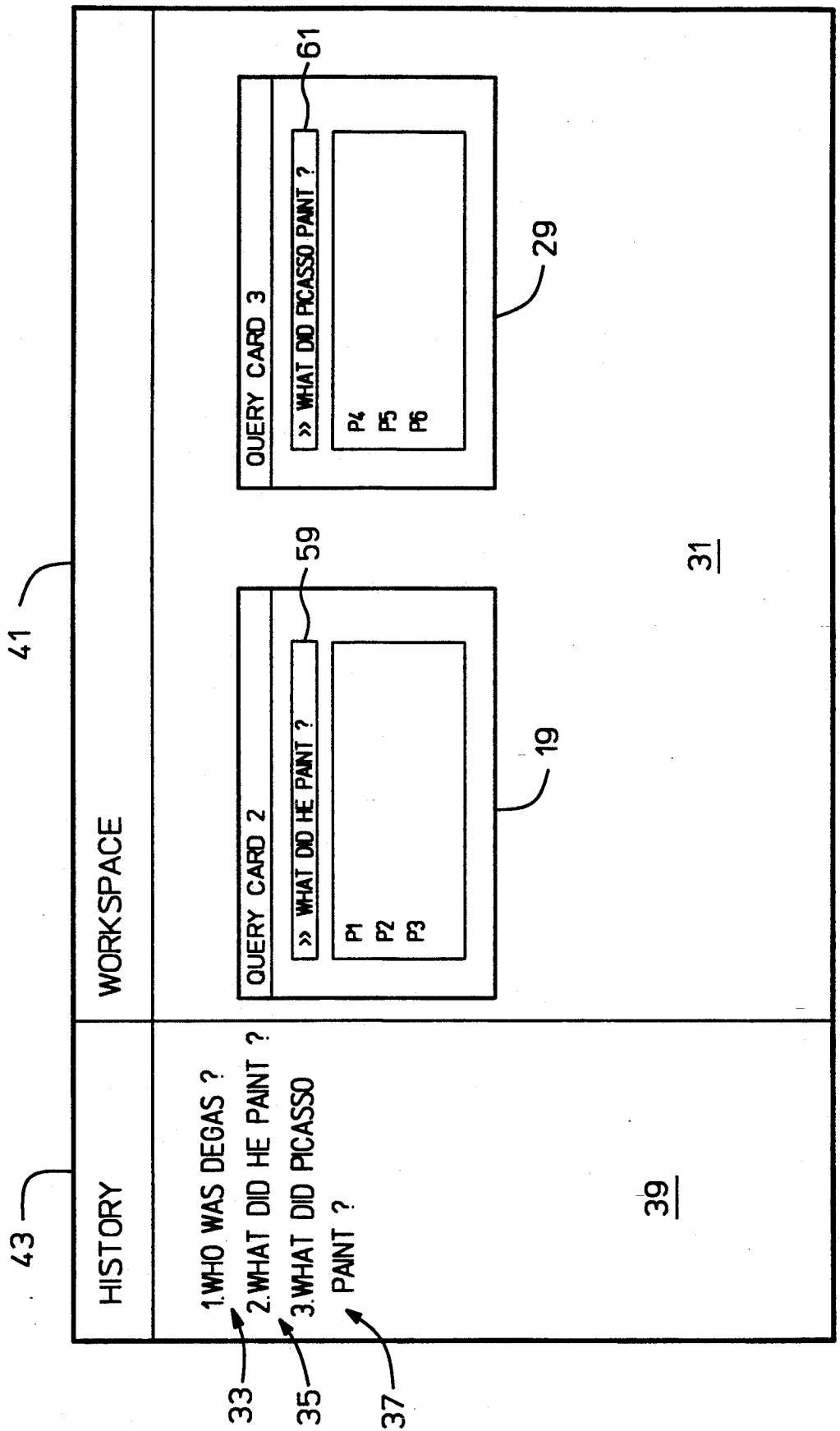
FIG. 2 is a detail view of a query card of the kind being displayed on the screen of the system of FIG. 1.

A preferred way of displaying the user's query and the system's response according to the invention comprises a query card such as the card 19 as best shown in FIG. 2. The card 19 has a first region 21 for displaying the query and a second region 23 for displaying the response to the query. The card 19 physically consists of an area of a computer display screen such as the screen 25, not a physical card. The card 19 preferably includes a title bar 27 for identifying the card; the card 19 is identified in the title bar by the legend "Query Card 2".

Figure 3:
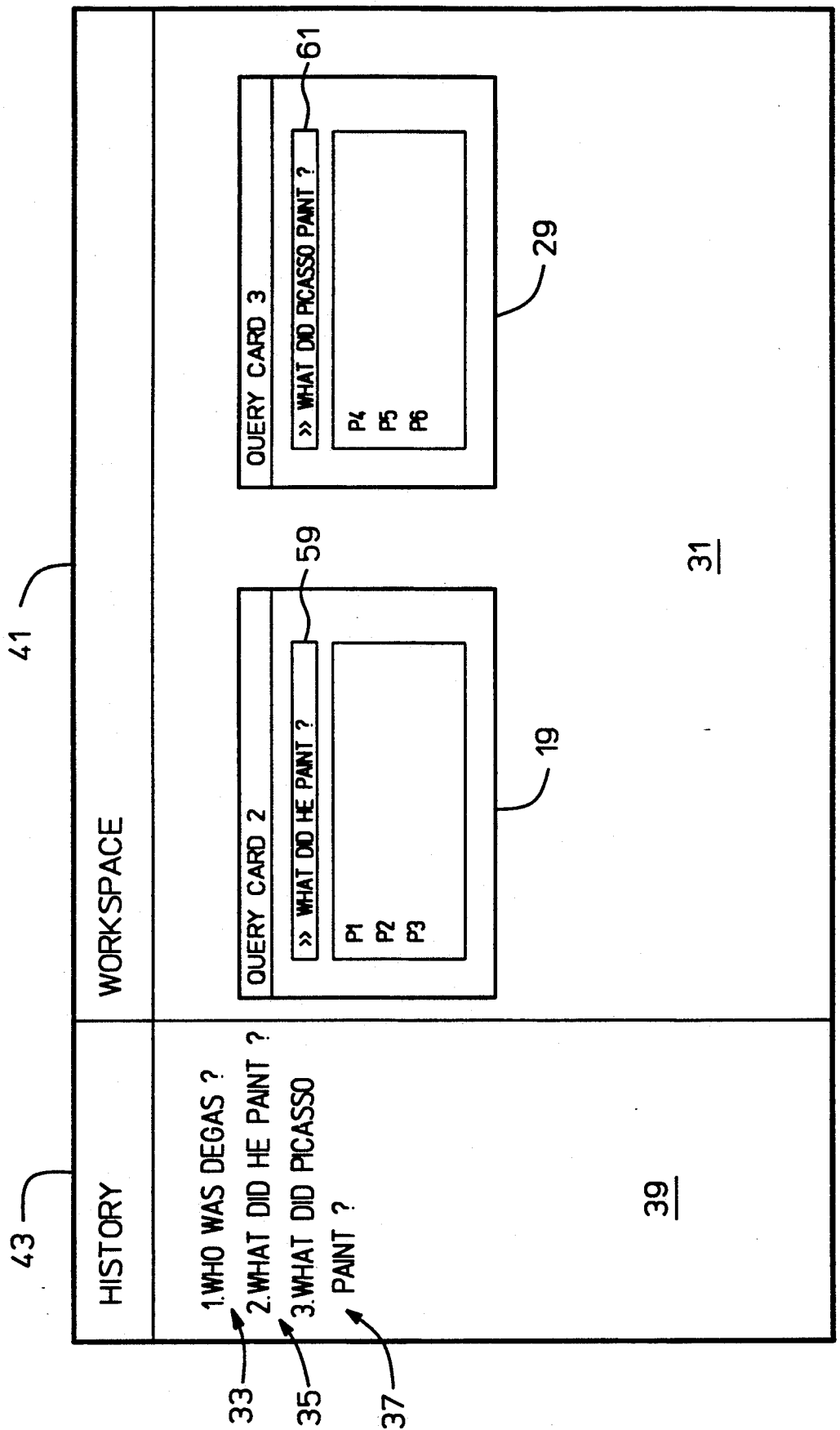
FIG. 3 is a detail view of the screen display as shown in FIG. 1.

As shown in FIG. 1 and in more detail in FIG. 3, the display screen 25 typically shows a plurality of query cards such as the card 19 and another card 29 arranged in a workspace 31, each card corresponding with a different query. The screen also includes a list of successive queries 33, 35 and 37 in a list or "history" area 39. In the example shown, the query 35 corresponds with the query card 19 and the query 37 corresponds with the query card 29; the query 33 corresponds with a query card that is not being displayed. The user has the option of displaying a query card corresponding with any query in the history list, for example by using the mouse 13 to point to the desired entry in the list.

Figure 4:
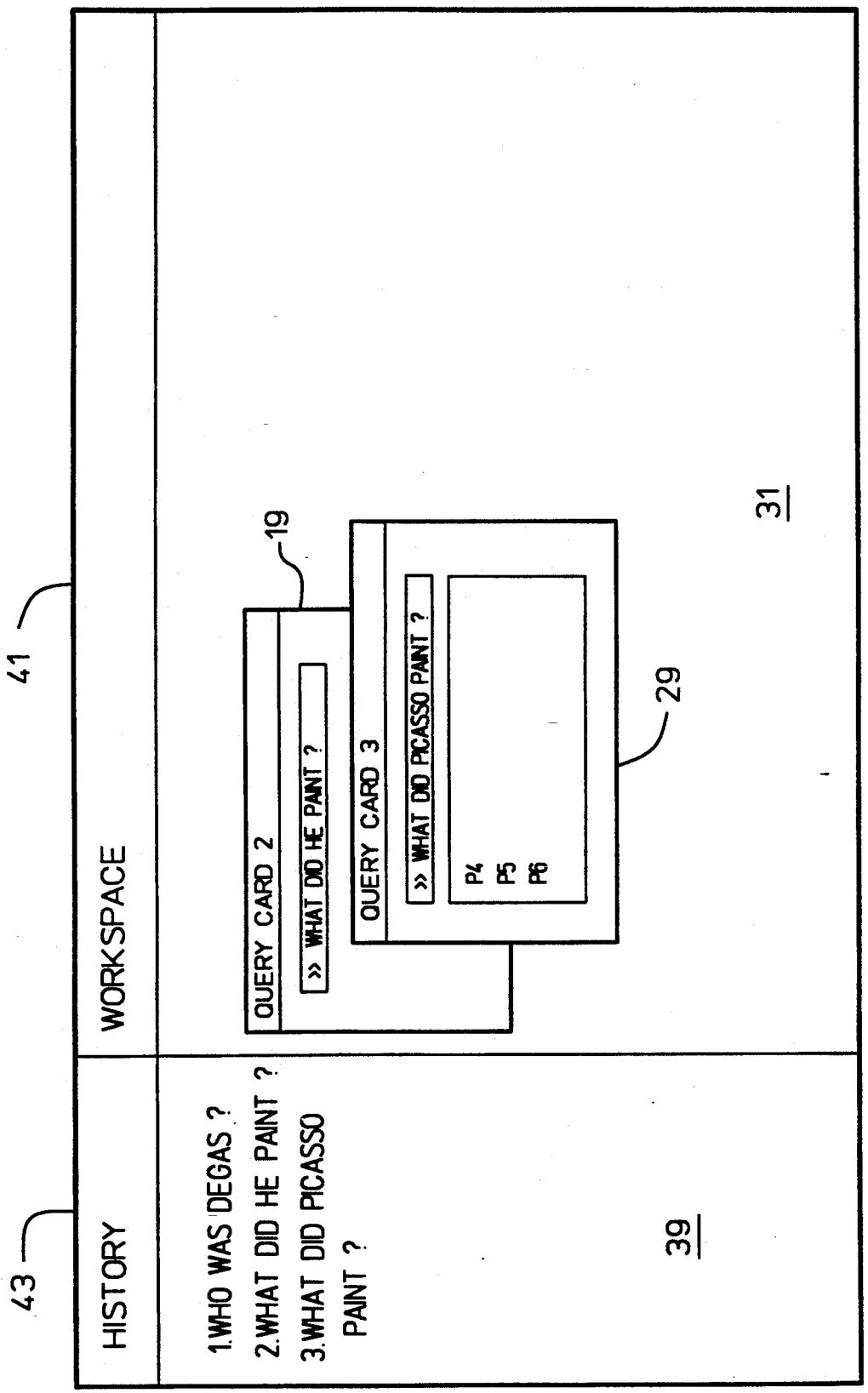
FIG. 4 is a view of an alternative arrangement of the display of FIG. 3.

In an alternative arrangement of query cards in the work space 31 as shown in FIG. 4, the query cards 19 and 29 are stacked on top of one another so as to fit more cards into a limited area of the display space. Typically the user is given the option of moving the query cards about the screen and stacking or unstacking them as desired, for example by using the mouse 13 to drag the cards from place to place.

The area of the display screen 25 which is used as the workspace 31 is identified on the screen with, for example, a title bar 41 containing the legend "workspace". Similarly, the area used as the history list is identified with a title bar 43 containing the legend "history".

Figure 5:
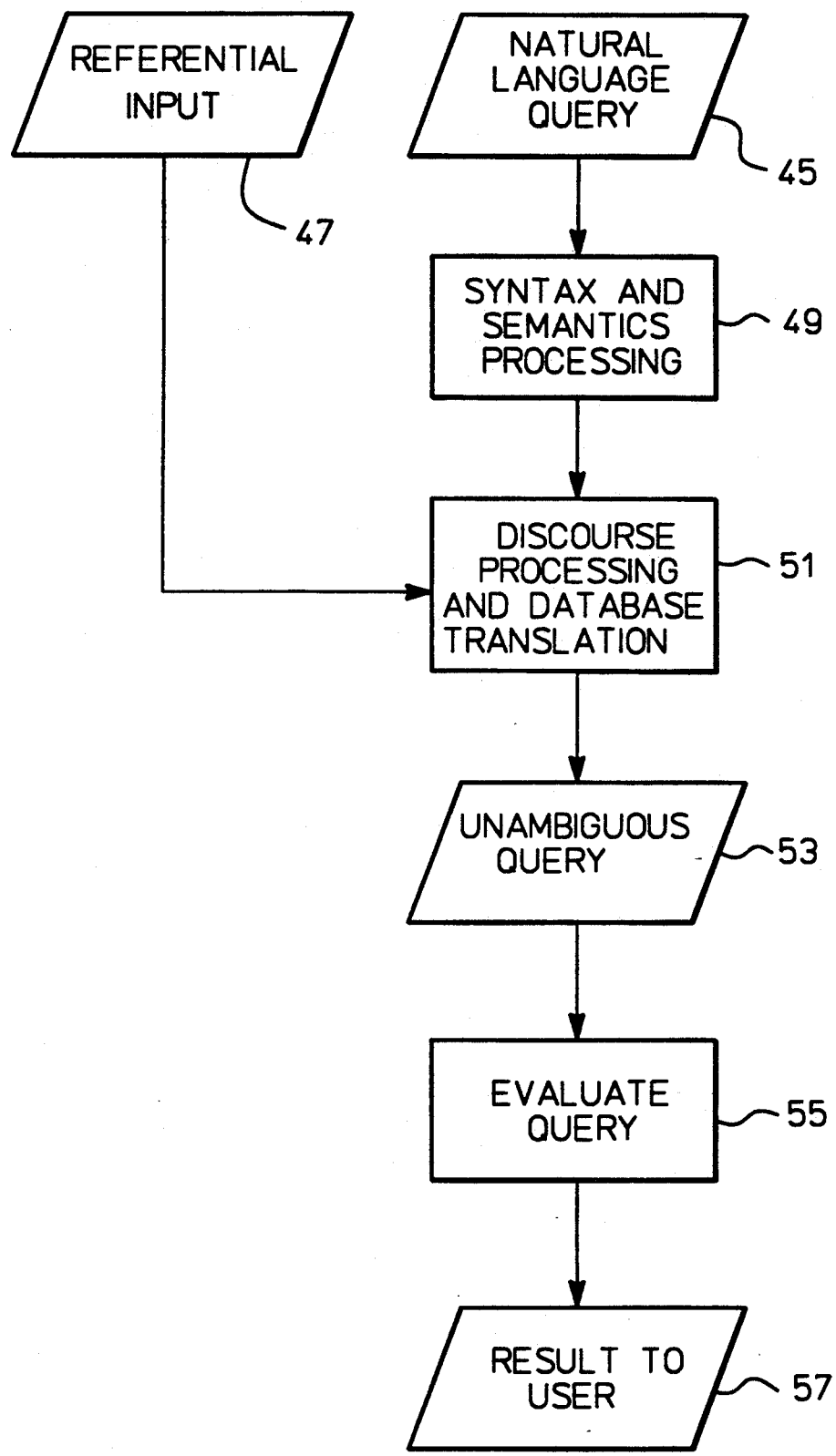
FIG. 5 is a flow chart of a method of resolving ambiguities in queries of a database system such as that depicted in FIG. 1.

As shown in flow chart form in FIG. 5, a method of querying a database according to the invention comprises receiving a database query such as a natural language query from a user (block 45); receiving a referential input from the user (block 47); identifying any referential expression in the query, for example by syntax and semantics processing of the natural language query (block 49); resolving any ambiguity in the referential expression according to the referential input, for example by discourse processing and database translation techniques (block 51) to provide an unambiguous query (block 53); evaluating the unambiguous query (block 55); and providing a result of the evaluation to the user (block 57).

Figure 6:
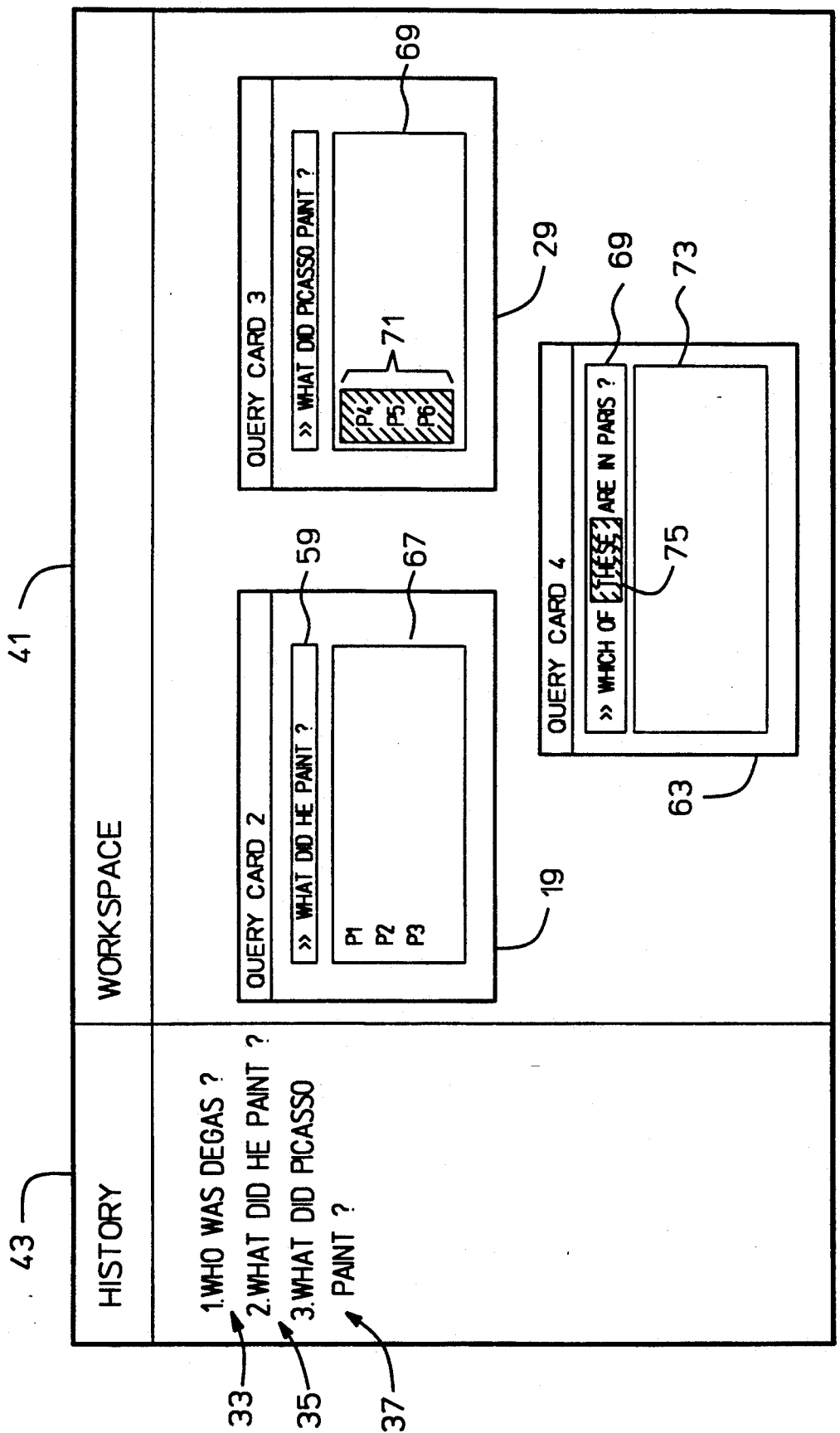
FIG. 6 is a view similar to that of FIG. 1 and showing an ambiguous textual query and a referential input that is used to resolve the ambiguity according to the invention.

As an example of how a referential ambiguity in a database query is resolved by utilizing a referential input provided by the user, consider the following sample dialogue between the user and the database system:
QUERY 1: Who was Degas?
RESPONSE: A French impressionist painter . . .
QUERY 2: What did he paint?
RESPONSE: P1, P2 and P3.
QUERY 3: What did Picasso paint?
RESPONSE: P4, P5 and P6.
QUERY 4: Which of these are in Paris?+{P4, P5, P6} as depicted in query card form in FIG. 6.

The first query (Who was Degas?) is included in the history space 39 and is identified with reference numeral 33. The user has chosen not to display the query card corresponding with this query.

The second query (What did he paint?) is included in the history space 39 and is identified with reference numeral 35. This query is displayed in its query card 19 and is identified with reference numeral 59. The third query (What did Picasso paint?) is displayed in its query card 29 and is identified with reference numeral 61. The responses to the second and third queries ("P1, P2 and P3" and "P4, P5 and P6") as displayed in response regions 67 and 69 of the query cards 19 and 29, respectively. The expressions "P1" through "P6" represent the names of various paintings. Of course, in a real database there would be many more than three titles of paintings painted by Degas or Picasso.

The fourth query includes both a textual input (Which of these are in Paris?) and a referential input (P4, P5, P6). The referential input is enclosed in curly braces to indicate that the user has employed a pointing device such as the mouse 13 to provide the referential input rather than providing it in textual form. The textual input of the fourth query is displayed in a current query card 63 and is identified with reference numeral 65. The referential input is indicated by highlighting the text which was pointed to, as indicated by shading and a reference. numeral 71. The query card 63 has a response region 73 which is empty because the system has not yet provided a response to this query.

An example of how a referentially ambiguous query would be processed without any multi-modal interaction follows. The natural language component as described herein is based on "HPNL", a natural language interface for database systems developed by the Hewlett-Packard Research Laboratories in Palo Alto, Calif. The second query in the above sample dialogue contains an ambiguous reference, specifically the pronoun "he". This query is syntactically analyzed and a representation of its syntactic structure is produced:

(QUESTION (S (NP he) (VP (V paint) (V paint)
(NP What))))

where
N means "noun"
P means "phrase"
V means "verb"
S means "sentence".

Semantics processing derives a representation of the meaning of the query from the syntactical analysis as follows:

(WHICH X s.t. (PAINT *REF(he) X))

where
s.t. means "satisfies".
The semantics representation thus characterizes the query as a request to find any values of X that satisfy the condition (PAINT *REF(he) X).

This condition comprises the semantic predicate PAINT and its two arguments—the painter, *REF(he), and the painting, X. An important point about this structure is that it only represents those aspects of meaning which can be derived from the query itself. It does not capture any aspects of the meaning which depend on the context in which it is uttered. Hence it is not yet known who the pronoun "he" refers to because that information lies outside the query.

The ambiguity as to the meaning of the pronoun "he" is resolved by discourse processing. In this example the discourse processor would first scan the semantics representation of the current query for any referring expressions which must be resolved. Here it would find the structure "REF(he)". It then looks at its history of the dialogue, looking for candidate male objects for the referent of "he". In this case "he" would be resolved to "Degas" by virtue of the reference to Degas in the preceding query. Thus the output of the discourse processing would be:

(WHICH X s.t. (PAINT DEGAS X)).

This query can be translated into a formal database query such as an SQL query which is then directed to the database to obtain a response.

Since there was only one query prior to the query that contained the ambiguous reference, the system was able to resolve the ambiguity without need of any input from the user. However, if more than one male name had occurred in previous queries, the system might have been unable to resolve the query and the result most likely would have been an irritating dialogue between the computer and the user somewhat similar to the example cited previously in the "background" section.

In a multi-modal interface according to the invention, an ambiguous reference is resolved quickly and simply without any need for the computer to pester the user with dumb (as perceived by the user) questions. As an example, in the fourth query of the sample dialogue the word "these" is ambiguous—it could, for example, refer back to the response to the third query or to the responses to both the second and third queries, since both responses comprise names of paintings. However, according to the invention the user employs the mouse to point to those painting names which the user intends to reference by the word "these".

Syntactic and semantics processing of the fourth query are as described above with reference to the second query and result in the following representation:

(WHICH X s.t. (IN X PARIS) & (X is_element_of *REF(THESE)))

Discourse processing is used, as before, to determine which of the elements is ambiguous. The referential input from the user provides the necessary reference for the ambiguous element.

Specifically, during discourse processing it is determined that *REF(THESE) needs to be resolved. This reference is then bound to the mouse input {P4, P5, P6} to produce the following structure:

(WHICH X s.t. (IN X PARIS) & (X is_element_of {P4, P5, P6}))

This query, as the previous one, is now translated into a formal database query such as an SQL query, and the computer system evaluates the query and provides the result of the evaluation as a response to the user.

Optionally, the system highlights the referential ambiguity as indicated by shading 75 over the word "these" in the query area 65 of the query card 63 to provide feedback to the user of how the system interprets the user's referential input and thereby give the user the opportunity to cancel or correct the query if there has been a misunderstanding between the user and the system. In another alternative the system rephrases the query after it has been recast in unambiguous form and displays the recast query to be sure the user is satisfied.

The invention is not dependent on any particular language. It is advantageously used to disambiguate natural language queries for translation into SQL queries, but it is not restricted to these languages.

A menu system (not shown) is advantageously used in conjunction with the query cards. For example, a pop-up or pull-down menu associated with each query card includes such options as "Process Query"; "Close (or Iconify) Card" to remove the card from the screen; "Move Card" to move the card about on the screen; and the like. Similarly, a menu associated with the history list is used to re-open cards that have previously been closed and to delete queries from the history.

The history list may be arranged to indicate a logical sequence of the flow of queries, for example by "nesting" as proposed by Cohen et al. in "Synergistic Use of Direct Manipulation and Natural Language", *CHI 89* *'Wings for the Mind' Conference Proceedings*, Austin, Tex., pages 227-233.

If a query contains more than one referential ambiguity (for example, "Which of these did he paint?"), the user points to first one and then another of the ambiguities, in each case providing a referential input as appropriate to remove the ambiguity.

The system may attempt to resolve ambiguities without any referential input from the user in the manner described above, prompting the user for a referential input only if such an attempt does not succeed as, for example, if the system encounters two or more possible references any of which could have been intended by the user.

From the foregoing it will be appreciated that the multi-modal interface system of the present invention provides a means for a user to point to one or more textual items to remove an ambiguous reference to such items. The invention advantageously provides query cards that a user can conveniently manipulate to arrange queries and responses as desired and to point to any desired elements in the responses to remove an ambiguous reference from a later query.

Although a specific embodiment of the invention has been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

We claim:

1. A multi-modal user interface comprising:
    input means for receiving from a user a textual database query which refers to an element not contained in the textual input and a referential input which refers to elements contained in responses to a plurality of previous queries from the user;
    means for detecting a referential ambiguity in the textual database query, the referential ambiguity comprising an ambiguous reference to the element not contained in the textual input;
    means for removing the referential ambiguity according to the referential input to provide an unambiguous query; and
    means for evaluating the unambiguous query and providing a result of the evaluation to the user.

2. An interface according to claim 1 wherein the input means comprises a mouse.

3. An interface according to claim 1 wherein the input means comprises a touch-sensitive screen.

4. An interface according to claim 1 wherein the input means comprises means responsive to human speech to provide a digital representation of spoken words.

5. An interface according to claim 1 wherein the input means comprises a visually-displayed query card having a first region in which the query is displayed and a second region in which the result is displayed.

6. An interface according to claim 5 wherein the input means comprises a plurality of visually-displayed query cards, one for each of a plurality of queries posed by the user, each such card displaying a different query and a response to that query.

7. An interface according to claim 6 wherein the input means comprises means for selecting an element of a response being displayed on a query card as the referential input.

8. An interface as in claim 1 wherein the element not contained in the textual database query comprises text that was provided by the user in preceding textual database queries.

9. An interface as in claim 1 wherein the element not contained in the textual database query comprises text that was provided to the user in response to preceding textual database queries.

10. A computer implemented method of querying a database, the method comprising:
receiving a database query from a user, the query referring to an element not contained in the query;
receiving a referential input from the user, the referential input referring to elements contained in responses to a plurality of previous queries from the user;
identifying any referential expression in the database query that refers to the element not contained in the database query;
resolving any ambiguous reference in the referential expression to the element not contained in the query according to the referential input to provide an unambiguous query;
evaluating the unambiguous query; and
providing a result of the evaluation to the user.

11. A method according to claim 10 and further comprising displaying a query card, displaying the query in a first portion of the card, and displaying the result in a second portion of the card.

12. A method according to claim 11 and further comprising displaying a plurality of query cards, one for each of a plurality of queries posed by the user, each such card displaying a different query and the response to that query.

13. A method according to claim 12 and further comprising displaying a list of previously-asked queries.

14. A method according to claim 12 wherein the step of receiving a referential input from a user comprises receiving the user's selection of text being displayed in the second portion of a query card as the referential input.

15. A method according to claim 14 wherein the user's selection of text comprises elements selected from responses to a plurality of previously-asked queries.

16. A method according to claim 14 wherein the user's selection of text consists exclusively of a portion of a response to a single query.

* * * * *